United States Patent Office.

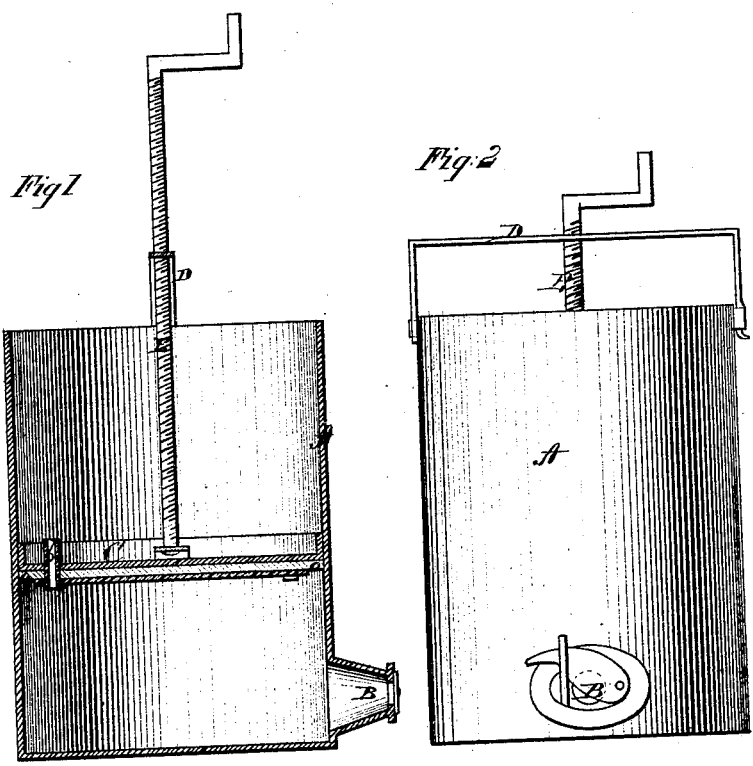

JOSEPH S. SHANEMAN AND JOSEPH S. HOON, OF BEAVER FALLS, PENNSYLVANIA.

Letters Patent No. 112,082, dated February 21, 1871.

IMPROVEMENT IN FRUIT-CANS.

The Schedule referred to in these Letters Patent and making part of the same.

*To all whom it may concern:*

Be it known that we, JOSEPH S. SHANEMAN and JOSEPH S. HOON, of Beaver Falls, in the county of Beaver and in the State of Pennsylvania, have invented certain new and useful Improvements in Fruit-Cans; and do hereby declare that the following is a full, clear, and exact description thereof, reference being had to the acccompanying drawing and to the letters of reference marked thereon making a part of this specification.

The nature of our invention consists in the construction and arrangement of a "fruit-can," as will be hereinafter more fully set forth.

In order to enable others skilled in the art to which our invention appertains to make and use the same, we will now proceed to describe its construction and operation, referring to the annexed drawing, in which—

Figure 1 is a longitudinal vertical section, and

Figure 2, a side elevation of our fruit-can.

A represents a can, made of tin or other suitable material, suitable for holding and preserving all kinds of fruit.

It is made of any size or shape required, and provided with an oblong air-tight spigot, B, near the bottom, on one side, for the purpose of extracting the fruit from the can.

Inside of the can A is a plunger, C, made of tin or other suitable material, with rubber packing *a* around it to make it air-tight.

An air-tube, *b*, is inserted in the plunger C, so that when the fruit is put in the can and the plunger is being pressed down all air will escape through said tube. When the plunger has reached the fruit then the tube is stopped up, leaving the fruit free from all air whatever.

At the top of the can A is attached a movable brace, D, with a screw, E, running through it, the lower end of the screw connecting with the plunger so as to raise and lower the same.

To extract the fruit from the can, open the spigot B at the bottom, and turn the screw E above so as to force the plunger down, thereby forcing the fruit through the spigot. By keeping the plunger pressed down on the fruit there cannot any air get into the can until all the fruit is taken out.

The fruit may be taken out in small quantities at a time, and by keeping the plunger screwed down the balance of the fruit will still remain free from any air whatever.

Having thus fully described our invention,

What we claim as new, and desire to secure by Letters Patent, is—

The plunger C, provided with packing *a* and air-tube *b*, and used in a fruit-can substantially as and for the purposes herein set forth.

In testimony that we claim the foregoing we have hereunto set our hands this 23d day of November, 1870.

JOSEPH S. SHANEMAN.
JOSEPH S. HOON.

Witnesses:
C. W. TAYLOR,
JAMES M. HOON.